(12) United States Patent
Cleary

(10) Patent No.: US 7,374,691 B2
(45) Date of Patent: May 20, 2008

(54) IN-SITU HYDRAULIC TREATMENT CONDUIT

(75) Inventor: John P. Cleary, Overland Park, KS (US)

(73) Assignee: T H Agriculture & Nutrition, Lenexa, KS (US)

( * ) Notice: Subject to any disclaimer, the term of this patent is extended or adjusted under 35 U.S.C. 154(b) by 48 days.

(21) Appl. No.: 11/263,611

(22) Filed: Oct. 31, 2005

(65) Prior Publication Data

US 2006/0157423 A1 Jul. 20, 2006

Related U.S. Application Data

(60) Provisional application No. 60/645,403, filed on Jan. 19, 2005.

(51) Int. Cl.
*C02F 1/00* (2006.01)

(52) U.S. Cl. ............ 210/747; 210/170.07; 405/128.45; 405/129.65

(58) Field of Classification Search ............... 210/747, 210/170.01, 170.07, 170.03; 405/128.45, 405/128.7, 129.2, 129.45, 129.65
See application file for complete search history.

(56) References Cited

U.S. PATENT DOCUMENTS

| | | | | |
|---|---|---|---|---|
| 4,919,568 A | * | 4/1990 | Hurley | 210/747 |
| 5,487,622 A | * | 1/1996 | Cherry et al. | 210/170.07 |
| 5,624,552 A | | 4/1997 | Vales et al. | |
| 5,725,760 A | * | 3/1998 | Monteith | 210/170.03 |
| 5,868,941 A | | 2/1999 | Gillham et al. | |
| 6,116,816 A | | 9/2000 | Suthersan et al. | |
| 6,221,243 B1 | * | 4/2001 | Flanagan | 210/170.03 |
| 6,224,770 B1 | * | 5/2001 | Savage et al. | 210/170.07 |
| 6,254,785 B1 | | 7/2001 | Phifer et al. | |
| 6,280,118 B1 | | 8/2001 | Suthersan et al. | |
| 6,287,472 B1 | | 9/2001 | Gillham et al. | |
| 6,663,781 B1 | * | 12/2003 | Huling et al. | 210/747 |
| 6,758,979 B1 | * | 7/2004 | Weiss et al. | 405/128.45 |
| 7,077,208 B2 | * | 7/2006 | Harrington et al. | 405/128.45 |
| 2004/0256297 A1 | * | 12/2004 | Jowett | 210/170 |

OTHER PUBLICATIONS

Steel and McGhee, "Water Supply and Sewage" 1979, pp. 339, 340, 351, 366.*

* cited by examiner

*Primary Examiner*—Christopher Upton
(74) *Attorney, Agent, or Firm*—Robert M. McDermott, Esq.

(57) ABSTRACT

A system is installed in the subsurface to control the hydraulic gradient between the area within a containment system and the area outside the containment system, and provides an easy-to-maintain treatment system. Preferably, the treatment system includes a sufficiently sized conduit between the inside-area and the outside-area that is accessible via a manhole. This conduit can be filled with remedial material or other treatment equipment, the manhole-sized access providing a relatively easy means of providing, maintaining, and replacing this material and equipment. Because the conduit is appropriately sized, hydraulic pressures on either side of the open conduit can be expected to be substantially equal, thereby reducing the potential of leakage of contaminants caused by hydrostatic pressure. Gates and screens are provided on either side of the conduit, to facilitate flow control, with manhole accessways to facilitate maintenance of these gates and screens.

25 Claims, 1 Drawing Sheet

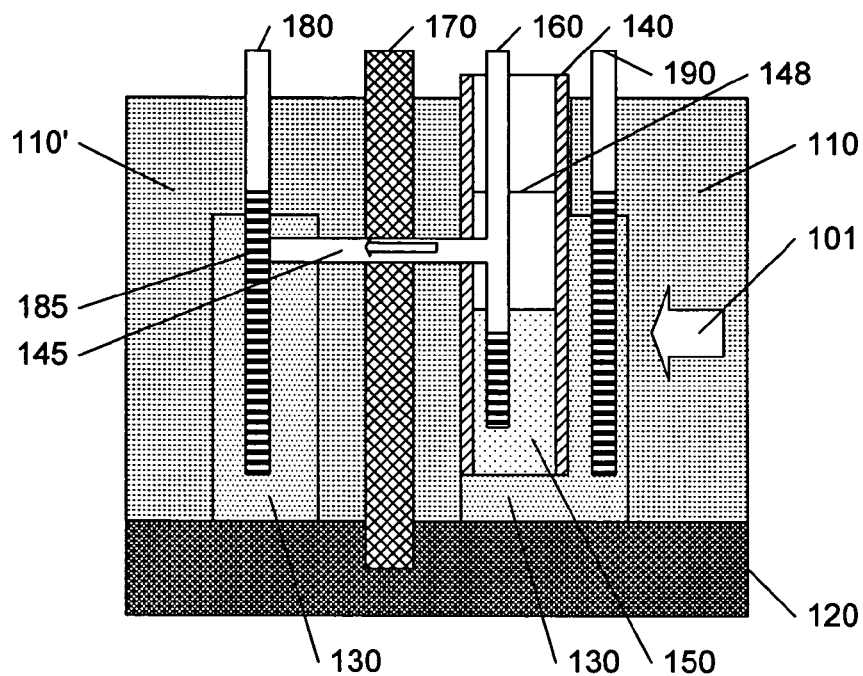
FIG. 1 [PRIOR ART]
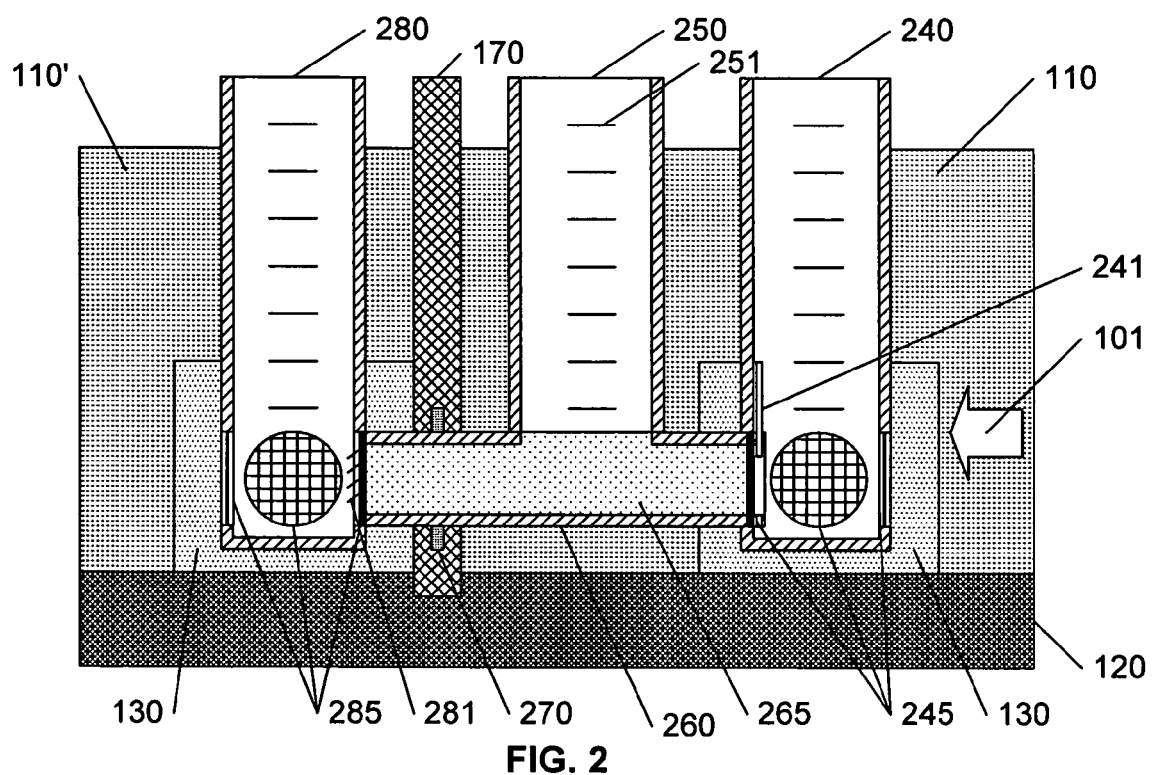
FIG. 2

IN-SITU HYDRAULIC TREATMENT CONDUIT

This application claims the benefit of U.S. Provisional Patent Application 60/645,403, filed 19 Jan. 2005.

BACKGROUND AND SUMMARY OF THE INVENTION

This invention relates to the field of environment-remediation systems, and in particular to a system and method for controlling the hydraulic gradient between a contained area and a non-contained area to minimize the potential for flow of aqueous matter through non desirable areas of permeable barriers. Of particular note, the invention addresses the option for treatment of fluids that enter the system during movement between the contained area and non-contained area.

The containment of environmental contaminants in groundwater is an area of ongoing concern. When contaminants are found in environmental media such as soil or groundwater, efforts are often undertaken to prevent an expansion of the contaminated area. In severe contamination cases, containment structures are used to restrict the flow of contaminants and groundwater from the area. These containment structures are typically designed to be keyed into a less permeable geologic formation and placed at the periphery of the contaminated area, and extend from the designed depth to the ground-surface. For ease of reference, the terms "inside-area" and "outside-area" are used hereinafter to distinguish between areas within the containment structure and areas outside the containment structure. Note that, depending upon the particular geology, the containment structure may not necessarily be constructed to form a closed perimeter, relying in part on the natural contour of the land or other factors to prevent the flow of contaminants away-from the contaminated area. In such cases, the "inside-area" is the area in which the contaminants are expected to be contained, by the containment wall or structure or other means.

With such a containment, means must be provided to remove the water that may accumulate in the inside-area, due to either above-ground sources (rain and other precipitation), or at-or-below-ground sources (natural groundwater flow). Generally, this water must be treated before it is released to the outside-area. In a typical embodiment, pumps and filters are used to pump water from the inside-area, through the filters, for release in the outside-area.

FIG. 1 illustrates a water-treatment system that eliminates the need for a pump, as taught by U.S. Pat. No. 6,116,816, "IN SITU REACTIVE GATE FOR GROUNDWATER REMEDIATION", issued 12 Sep. 2000 to Suthersan et al., and incorporated by reference herein. A barrier wall 170 separates the inside-area 110 to the right of the wall 170 from the outside-area 110' to the left of the wall 170. A well 140 is dug in the inside-area, and a pipe 145 from this well 140, below the expected water level 148, traverses the barrier wall 170 to the outside-area. Remediation material 150 is provided in the well 170, preferably contained in permeable bags, to facilitate replacement of the material 150. The pipe 145 leads to a discharge zone 185 in the outside-area 110', which may include another well (not shown). Porous material 130, such as sand, surrounds the well 140 and the discharge zone 185, to facilitate the flow of water from the inside-area 110 to the outside-area 110'. Viewing tubes 160, 180, 190 are provided for monitoring the state of the system. The containment wall 170 is embedded in low-permeability bedrock 120. As groundwater flows 101 toward the containment wall, it accumulates in the well, via the filtration material 150, and flows to the outside-area whenever the water level 148 exceeds the effective water level in the outside-area.

The system of FIG. 1 exhibits a number of disadvantageous features. If the treatment of fluids does not meet the desired end point concentrations, the system does not have a mechanism to stop the flow of fluids from the contained area 110. Although the use of permeable bags for containing the remediation material 150 facilitates replacement of the material 150, it may be difficult to assure a "seal" about the bags to prevent contaminated materials from entering the well 140 and migrating around the bags through preferential pathways. Additionally, many treatment agents cannot be contained by a bag system. Should contaminants or formation materials enter the well 140, or other problems develop in the well 140, it will be difficult to repair the problem, and, in all likelihood, a costly installation of a new well 140 and pipe 145 may be required.

It has been found that a substantial difference in hydraulic pressure between the inside-area and the outside-area is likely to cause some flow of the water between the areas, via the bedrock 120 and other less-than-perfect seals between the inside-area and outside-area. Although Suthersan et al. do not specify the width of the well 140 and pipe 145, the use of the term 'well', and references to the lowering of bags of material 150 into the well indicate relatively narrow conduits for the flow of water, generally in the order of a few inches in diameter. Such a system will not necessarily have a significant impact on equalizing the hydraulic pressures between the inside-area and the outside-area, and the likelihood of contaminated water passing from the inside-area to the outside-area in an uncontrolled fashion remains.

It is an object of this invention to provide a mechanism for controlled flow from containment systems such that uncontrolled flow through the containment structure of contaminated liquids is minimized. It is a further object of this invention to provide a flow option for containment systems that is cost-effective to operate and maintain.

These objects, and others, are achieved by providing a system that serves to control the hydraulic gradient between the area within a containment system and the area outside the containment system, coupled with an option of treating contaminated fluids. Preferably, the treatment system includes a large conduit between the inside-area and the outside-area that is accessible via a manhole. This conduit can be filled with materials for the treatment of groundwater, the manhole-sized access providing a relatively easy means of providing and replacing this material. Because the conduit design can easily be scaled up or down in size as appropriate for a given hydrogeologic setting, large hydraulic pressures on either side of the open conduit can be expected to be substantially equal. Gates and screens are provided on either side of the conduit, to facilitate flow control, with manhole accessways to facilitate maintenance of these gates and screens.

BRIEF DESCRIPTION OF THE DRAWINGS

The invention is explained in further detail, and by way of example, with reference to the accompanying drawings wherein:

FIG. 1 illustrates an example prior art gating and treatment system.

FIG. 2 illustrates an example In-Situ Hydraulic Treatment Conduit in accordance with this invention.

Throughout the drawings, the same reference numerals indicate similar or corresponding features or functions. The drawings are included for illustrative purposes and are not intended to limit the scope of the invention.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known components and methods are omitted so as not to obscure the description of the present invention with unnecessary detail.

The invention is premised on the observation that control of the gradient of hydraulic pressures between a contained area and an outside-area will have a significant impact of the effectiveness of a containment system. To this end, FIG. 2 illustrates an example hydraulic treatment conduit in accordance with this invention.

In FIG. 2, a conduit 260 with a diameter sized according to the local hydrogeologic setting traverses a containment wall 170, and provides a means of equalizing the hydraulic pressure between an inside-area 110 and an outside area 110'. Typically, the conduit 260 is placed deeper than the lowest anticipated water table elevation, but this depth will be dependent upon the geographic/hydrogeologic profile at the particular site. A seep-ring 270 provides additional seal to the conduit 260 within the containment wall 170 to prevent fluids from leaking along the exterior of the conduit through the wall.

The appropriate diameter of the conduit 260 for equalizing the hydraulic pressure can be determined based on hydraulic measurements in the area over an extended period of time, or based on engineering estimates, using techniques common in the art. Preferably, the conduit 260 is sized to allow for sufficient water transmission such that the elevation differential inside and outside of the containment area can be kept to a minimum. Generally, the conduit piping will be sized from a few feet to ten feet or larger in diameter to accommodate most situations. At hydraulic heads of one, two, and three feet, a six foot diameter conduit 260 that is filled with a 30% porous material 265, such as granular activated carbon, can support hydraulic flows of 352, 705, and 1057 gallons per minute, respectively. By providing a sufficient flow capacity through the conduit 260, the loss of groundwater from the inside-area 110 to the outside-area 110' via uncontrolled releases through the bedrock 120, or other seepage routes, is minimized.

As noted above, the conduit 260 is configured to be fillable with remedial material 265, and/or to accommodate other equipment, to provide the desired treatment processes or chemical reactions for the treatment of any liquids that flow from the inside-area 110 to the outside area 110'. In a preferred embodiment, the length of the conduit 260 is selected so as to accommodate necessary treatment reaction times while the fluid is routed through the conduit. To facilitate installation, monitoring, and replacement of the material 265, a manhole-sized conduit-accessway 250 is provided. The accessway 250 is illustrated as being within the inside-area, although one of ordinary skill in the art will recognize that it can be located on either side of the containment wall 170. Preferably, the accessway 250 includes a ladder 251 and is large enough in diameter at the area of the conduit 260, to facilitate the manual placement and removal of the remedial material or other treatment equipment 265.

At the ends of the conduit 260, flow-control gates 241, 281 are provided, with manhole-sized port-accessways 240, 280 to facilitate maintenance of the input or output ports of the conduit 250. As illustrated, the accessways 240, 280 extend below the conduit 260 and serve to provide a means for the groundwater to enter and leave the conduit 260. Porous filter-pack material 130, such as sand or gravel, can be used as necessary to surround the lower parts of the accessways 240, 280. Screens 245, 285 allow water to enter the accessways 240, 280 while preventing the filter-pack material 130 or treatment material 265 from entering the accessways. As illustrated, multiple screens 245 provide an inlet for the groundwater to enter the accessway 240; each of these screens can be as large as the screen at the conduit 260, thereby maximizing the intake capacity for fluids and allowing for some blockage of these water-inlet screens over time by silt, clay, or other fine particles without affecting the designed flow-rate through the conduit 260. Additional screen area can be achieved by adding screen box extensions on either end of the conduit.

The flow-control gates 241, 281 serve to control the flow through the conduit 260. The gate 241 is illustrated as a sliding gate that is lowered or raised to close or open the port; the gate 281 is illustrated as a flapper gate that may be configured to automatically prevent the back-flow of water from the outside-area 110' to the inside-area 110, if desired. Flapper gate 281 may be replaced or augmented by a sliding gate 241 to provide a mechanism to shut off flow through the conduit 260 for maintenance purposes.

In a typical embodiment of this invention, construction material common in the art is used. The conduit 260, for example, may comprise reinforced-concrete pipes, with a reinforced-concrete tee forming the junction between the conduit 260 and the accessway 250. Other metal or synthetic materials, such as high density polyethylene, or equivalent, may also be used. The accessways 240, 280 are also typically constructed of reinforced concrete. The screens 245, 285 are preferably constructed of materials that withstand the formation pressure and corrosion such as 304-gauge stainless steel, with a slot size sufficient to filter out the geologic materials or filter pack material 130 outside the screens and to contain the treatment material 265 at the conduit openings. The slide gates 241, 281 are preferably metal/plastic composites that are lifted with a gear system driven by motors or manual operation. The screens 245, 285 and gate 241 are preferably assembled from pieces that are sized to fit through the accessways 240, 280, to facilitate their installation and removal.

Typically, treatment media 265 such as granular activated carbon can be used for many types of organic contaminants found at cleanup sites. The amount of carbon required to treat the groundwater will be dependent upon the nature and severity of the contamination The foregoing merely illustrates the principles of the invention. It will thus be appreciated that those skilled in the art will be able to devise various arrangements which, although not explicitly described or shown herein, embody the principles of the invention and are thus within its spirit and scope. For example, although two similar accessways 240, 280 are illustrated, each with gates 241, 281, one of ordinary skill in the art will recognize that a single gate could be used to control the flow through the conduit 260.

In like manner, the structure of the accessway 280, being in the outside-area, need not be the same as the structure 240 in the inside-area, and in some cases may not be necessary if access to the screens 245 is not required. For example, if the ground 110' slopes away from the barrier 170, a discharge pipe, such as a sewer pipe, may be sufficient to lead the treated liquid away from the conduit 260. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

I claim:

1. A hydraulic treatment system comprising:
a conduit that traverses a barrier that isolates groundwater in an inside-area from groundwater in an outside-area and includes an input port coupled to the inside-area, an output port coupled to the outside-area, and a substantially impervious hollow structure that couples the input port to the output port,
the conduit being:
sufficiently sized so as to minimize a hydraulic gradient of groundwater between the inside-area and the outside-area, and
configured to contain treatment material or equipment suitable for treating groundwater that passes through the conduit from the inside-area to the outside-area;
a conduit-accessway that is configured to facilitate access to the conduit between the outlet port and the access port for placing and removing the treatment material, and
a port-accessway that is configured to facilitate access to a collection sump that provides groundwater in the inner-area to the input port.

2. The system of claim 1, further including:
a controllable gate at the input port of the conduit that is configured to facilitate control of a flow of groundwater through the conduit.

3. The system of claim 2, wherein:
the port-accessway is configured to facilitate access to the gate and the input port.

4. The system of claim 3, wherein
the input port of the conduit includes a conduit-screen that is configured to prevent the treatment material from entering the port-accessway.

5. The system of claim 3, wherein
the port-accessway is configured to be embedded in a porous filter-pack material, and
the port-accessway includes one or more screens that are configured to prevent the filter-pack material from entering the port-accessway.

6. The system of claim 3, wherein
each of the port-accessway and the conduit-accessway is a manhole that is configured to facilitate entry of at least one person.

7. The system of claim 1, wherein
the conduit includes at least one of:
a reinforced concrete pipe, and
a high density polyethylene pipe.

8. The system of claim 1, wherein
a diameter of the conduit is sized based on a minimum flow required to substantially minimize a hydraulic gradient between the inside area and the outside area.

9. The system of claim 8, wherein
a length of the conduit is sized based on a minimum treatment time for the groundwater flowing through the conduit.

10. The system of claim 1, wherein
the conduit-accessway comprises reinforced concrete and is at least six feet in diameter at the conduit.

11. The system of claim 1, wherein
a reinforced concrete tee is used to join the conduit-accessway and the conduit.

12. The system of claim 1, further including
another port-accessway that is configured to facilitate access to a discharge sump coupled to the outside area.

13. The system of claim 1, further including:
a controllable gate at the output port of the conduit that is configured to facilitate control of a flow of groundwater from the conduit.

14. A method of treating groundwater, comprising:
providing a substantially hollow conduit structure that horizontally traverses a hydraulic barrier that separates an inside-area from an outside-area,
the conduit being below a level of the groundwater, and having an input port coupled to the inside-area, and an output port coupled to the outside-area,
providing a first manhole-size accessway to the conduit at a location that is between the input port and the output port, and
providing a second manhole-size accessway at the input port of the conduit, the second accessway being configured to provide a collection sump that allows the groundwater to enter the conduit via the second accessway.

15. The method of claim 14, further including:
filling the conduit with treatment material or treatment equipment via the first accessway.

16. The method of claim 14, further including:
providing a controllable gate at the input port of the conduit to control a flow of the groundwater through the conduit.

17. The method of claim 14, further including:
providing one or more screens at the second accessway to prevent material other than the groundwater from entering the second accessway.

18. The method of claim 14, further including:
providing a third manhole-size accessway at the output port of the conduit, the third accessway being configured to allow the groundwater to exit the conduit via the third accessway.

19. The method of claim 18, further including:
providing a controllable gate at the output port of the conduit to control a flow of the groundwater through the conduit.

20. The method of claim 18, further including:
providing one or more screens at the third accessway to prevent material other than the groundwater from entering the third accessway.

21. The method of claim 14, further including:
sealing the conduit to the barrier via a seep ring.

22. The method of claim 14, further including:
providing the barrier that separates the inside-area from the outside-area.

23. The method of claim 14, further including
determining a minimum treatment time for the groundwater as the groundwater traverses the conduit, and
determining a length of the conduit based on the minimum treatment time.

24. The method of claim 14, further including:
determining a minimum flow of the groundwater that will minimize a hydraulic gradient between the inside-area and the outside-area, and
determining a cross-section area of the conduit based on the minimum flow.

25. The method of claim 24, further including
determining a minimum treatment time for the groundwater as the groundwater traverses the conduit, and
determining a length of the conduit based on the minimum treatment time.

* * * * *